United States Patent [19]

Yasuda

[11] 4,387,290

[45] Jun. 7, 1983

[54] ANTI-FREEZING SYSTEM FOR A WINDSHIELD-WIPER

[75] Inventor: Akira Yasuda, Tokyo, Japan

[73] Assignee: Nissan Motor Company, Limited, Yokohama, Japan

[21] Appl. No.: 209,029

[22] Filed: Nov. 21, 1980

[30] Foreign Application Priority Data

Dec. 3, 1979 [JP] Japan ................................. 54-166221

[51] Int. Cl.³ .......................... H05B 1/02; B60S 1/02; B60H 1/02
[52] U.S. Cl. ..................................... 219/202; 165/41; 15/250.07; 237/12.3 R
[58] Field of Search ................ 237/12.3 R; 15/250.04, 15/250.05, 250.07, 250.09; 165/41; 219/202, 203

[56] References Cited

U.S. PATENT DOCUMENTS

| | | | |
|---|---|---|---|
| 1,937,286 | 11/1933 | McCarthy | 15/250.09 |
| 3,934,111 | 1/1976 | Roselli et al. | 15/250.05 |
| 4,152,808 | 5/1979 | Andregg | 15/250.07 |

FOREIGN PATENT DOCUMENTS 1268506 5/1968 Fed. Rep. of Germany ... 15/250.07

Primary Examiner—Albert J. Makay
Assistant Examiner—Henry Bennett
Attorney, Agent, or Firm—Lane, Aitken & Kananen

[57] ABSTRACT

An anti-freezing system for a windshield-wiper of a vehicle including a cut off device, which may be a relay, responsive to a temperature sensor which senses the ambient temperature. The cut off device energizes a heater to heat the windshield-wiper when and only when the ambient temperature as sensed by the temperature sensor is below a predetermined value. The system may include a control device, which may be a relay, responsive to the output of an electric generator provided in the automotive vehicle and adapted to disable the heater unless the electric generator is delivering power. The system may further include a manual override switch whereby the heater may be supplied with power, irrespective of the state of the cut off device. The heater may be provided extending along an elongated wiper support, or may be embedded in a wiper blade supported by the wiper support. The temperature sensor is preferably provided on the windshield-wiper in a position where the temperature sensor is free from the influence of the heater.

6 Claims, 4 Drawing Figures

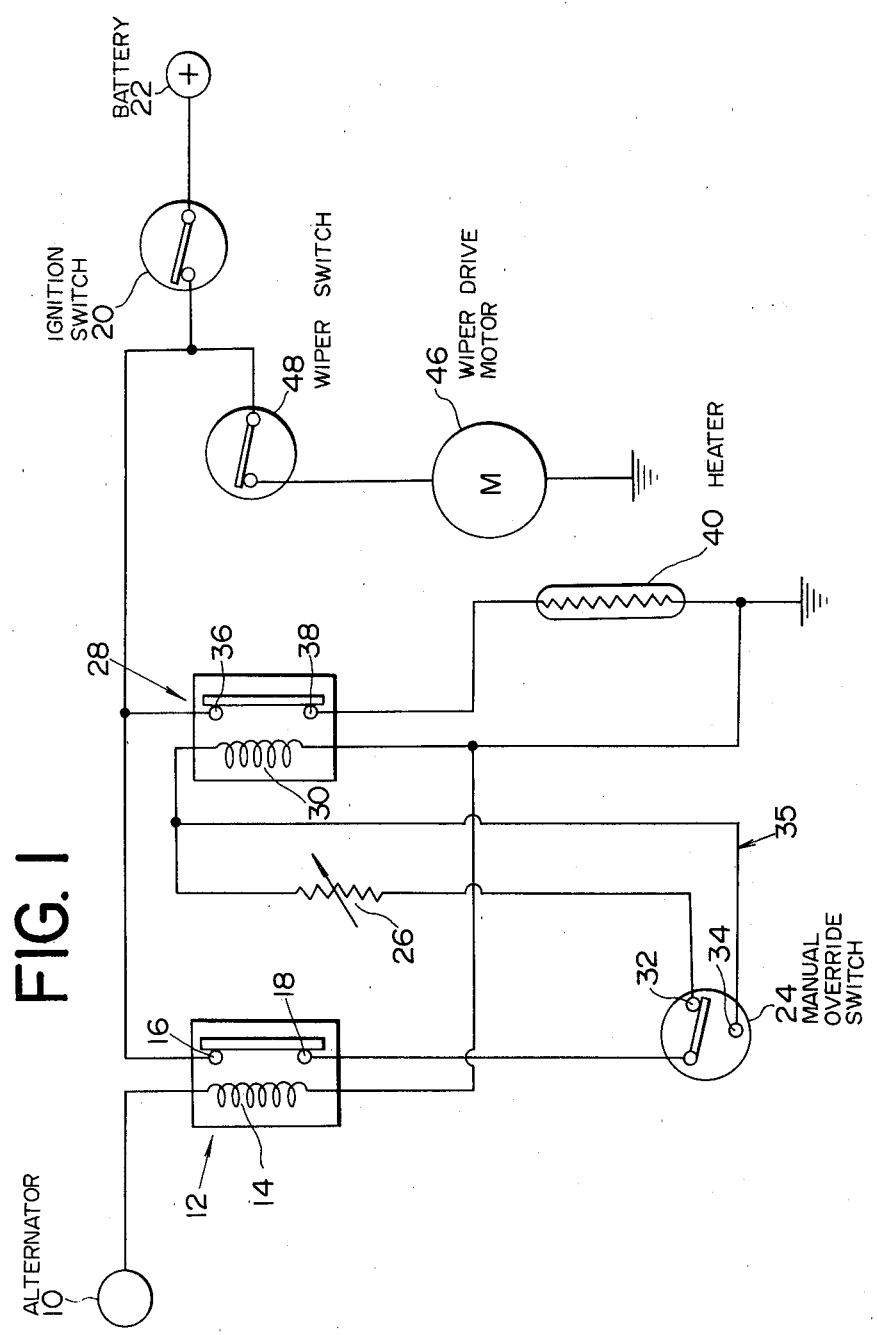

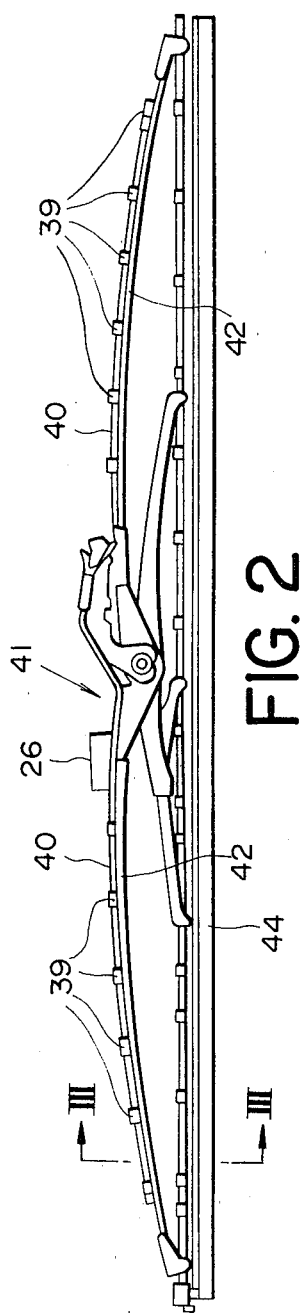
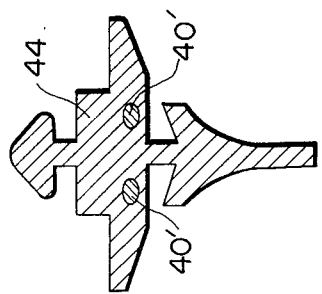
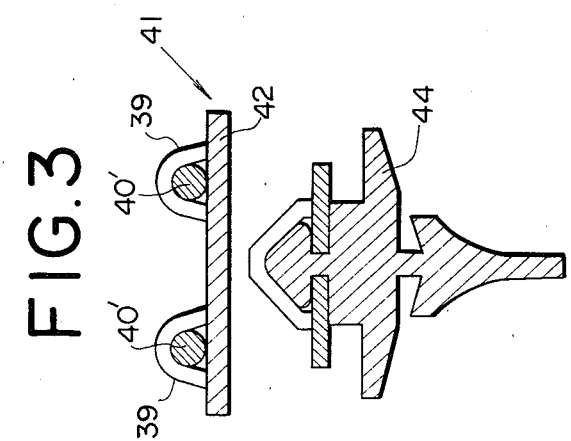

ANTI-FREEZING SYSTEM FOR A WINDSHIELD-WIPER

BACKGROUND OF THE INVENTION

1. Field of the Invention

The present invention relates to an antifreezing system for a windshield-wiper of a vehicle, and more particularly to a system which prevents the freezing of moisture sticking thereto to ensure proper visibility when it is cold.

2. Description of the Prior Art

When snow or moisture sticking to the wiper blade or the wiper support of a windshield-wiper is subjected to a cold wind while the vehicle is being driven, it is frozen, so that the windshield-wiper may not operate, a return spring within the wiper support may become ineffective, or ice may form between the windshield glass and the wiper blade to raise the windshield-wiper, thereby rendering the same incapable of wiping the windshield glass. All of these effects are most undesirable, and present serious threats to safe driving.

In order to avoid this undesirable situation, in cold districts, the whole wiper support has conventionally been covered with rubber to prevent freezing. This measure, however, cannot completely prevent freezing of moisture, and in addition restricts the driver's visibility because the rubber covering the wiper support makes it rather bulky. This also increases the resistance to moving the wiper and therefore the load on the electric motor which drives the wiper. The present invention intendes to eliminate these drawbacks.

SUMMARY OF THE INVENTION

A windshield-wiper for an automotive vehicle according to the present invention includes cut off means responsive to temperature sensitive means which senses the ambient temperature. The cut off means energizes a heater to heat the windshield-wiper when the ambient temperature as sensed by the temperature sensitive means is below a predetermined value. The windshield-wiper may include control means responsive to the output of an electric generator provided in the automotive vehicle and adapted to disable the heater unless the electric generator is delivering power. The windshield-wiper may also include a manual override switch whereby the heater may be supplied with power, irrespective of the state of the cut off means. The heater may be provided extending along an elongated wiper support, or may be embedded in a wiper blade supported by the wiper support. The temperature sensitive means is preferably provided on the windshield-wiper in a position where the temperature sensitive means is free from the influence of the heater.

BRIEF DESCRIPTION OF THE DRAWINGS

The above and other objects, features and advantages of the present invention will be more clearly appreciated from the following description of a preferred embodiment thereof taken in conjunction with the accompanying drawings in which the same reference numeral designates corresponding elements and in which:

FIG. 1 is an electrical circuit diagram of a preferred embodiment of a windshield-wiper according to the prevent invention;

FIG. 2 is a side elevation of the embodiment of the windshield-wiper according to the present invention;

FIG. 3 is an enlarged cross-sectional view taken along a line III—III in FIG. 2; and FIG. 4 is an enlarged cross-sectional view, similar to FIG. 3, of the wiper blade of a second embodiment of the present invention.

DETAILED DESCRIPTION OF THE PREFERRED AND ALTERNATIVE EMBODIMENTS

Referring to FIG. 1, there is shown the electrical circuit constituting part of one preferred embodiment of a windshield wiper according to the present invention. The electrical circuit includes an alternator driven by an engine, not shown, to produce electric power. The output of the alternator is grounded through the coil 14 of a first relay 12. The relay 12 includes contacts 16 and 18 closed only when the relay coil 14 is energized by the electric power from the alternator 10. Of course, in this embodiment an AC relay will be used, but if the vehicle is provided with a DC generator, a DC relay will be used. It will be seen that other switching means such as a transistor could also replace this and the other relay described below.

The relay contact 16 is connected through an ignition switch 20 to a power supply such as a battery 22 while the relay contact 18 is grounded through a two-way manual override switch 24, a temperature sensor 26 and the coil 30 of a second relay 28 to energize the same from the power supply, when the switch 24 is in a position 32. When the switch 24 is in another position 34, the temperature sensor 26 is disconnected from the switch 24 and as a result, electric power is supplied to the relay coil 30 through a bypass circuit 35 from the switch position 34. When the first relay 12 is energized, the relay coil 30 of the second relay 28 is also energized from the power supply 22 to close the contacts 36, 38 whereas when the first relay 12 is deenergized, the coil 30 is also deenergized to open the contacts 36, 38. The relay contact 36 is connected through the ignition switch 20 to the power supply 22, whereas the relay contact 38 is grounded through a heater 40 to heat a windshield-wiper, shown by 41 in FIG. 2. The sensor 26 is preferably provided in a position, such as on the wiper support 42 shown in FIG. 2, where the sensor is not affected by the heater 40. This is important because the cooling effect of the wind past the windshield wiper is quite pronounced, especially at high speeds. Thus, even though the stationary ambient temperature is quite warm, the apparent temperature on the windshield wiper may be much lower, and it is important that the sensor be able to detect this.

The temperature sensor 26 is of the type which increases and decreases in resistance as the ambient temperature rises and lowers, respectively. When the ambient temperature lowers beyond a predetermined value, the resistance of the sensor 26 becomes sufficiently low to enable the relay coil 30 to be energized through the sensor 26, whereas when the ambient temperature rises beyond the predetermined value, the resistance of the sensor 26 increases to disable the relay coil 30. The heater 40 should be provided in a position where moisture sticking to the windshield-wiper is prevented from freezing. For example, a pair of heater elements 40' may be provided which are held by a plurality of retainers 39 along substantially the whole length of the metal wiper support 42 which supports the wiper blade 44 as shown in FIGS. 2 and 3. Alternatively, a pair of heater elements 40' may be embedded in the wiper blade 44, as shown in FIG. 4. A wiper drive motor 46 is connected through a wiper switch 48 to the ignition switch 20.

In operation, the switch 24 is normally set to the position 32. When the ignition switch 20 is switched on to start the engine, the alternator 10 is driven to produce electric power. This electric power energizes the relay coil 14 to close the contacts 16, 18 and as a result, the power supply 22 supplies electric energy to the relay coil 30 through the ignition switch 20, the relay contacts 16, 18, the switch 24, and the temperature sensor 26 to energize the relay coil 30 when the ambient temperature is lower than the predetermined value. Thus, in freezing conditions, the relay contacts 36, 38 are closed so that the power supply 22 supplies electric energy to the heater 40 through the ignition switch 20 and the closed contacts 36, 38 to heat the windshield-wiper and its vicinity.

When the switch 24 is switched to the position 34, the electric energy from the first relay 12 is directly supplied to the second relay coil 30 to heat the heater 40, irrespective of the temperature sensor 26. This is advantageous in preventing moisture freezing in an emergency should the temperature sensor malfunction.

The fact that the heater is energized only when the ambient temperature is lower than a predetermined value and the alternator is producing electric energy serves to prevent excessive load on the power supply 22 and overheating of the heater.

While the present invention has been described and shown with respect to the preferred and alternative embodiment thereof, the present invention is not limited to these embodiments. Many modifications and variations of the preferred embodiment could be easily obvious to those skilled in the art without departing from the spirit and the scope of the present invention.

What is claimed is:

1. An anti-freezing system for a windshield-wiper of an engined vehicle, comprising:
    (a) a heater adapted to heat said windshield-wiper;
    (b) a first relay switch for supplying heating electric power to said heater when energized with a current value greater than a predetermined value;
    (c) an electric generator driven by the engine to produce electric power;
    (d) a second relay switch connected to said electric generator for supplying electric power when energized; and
    (e) a temperature sensitive means including a resistance changing with the ambient temperature for sensing the ambient temperature, said temperature sensitive means being connected between said second relay switch and said first relay switch so as to supply a current greater than the predetermined value from said second relay switch to said first relay switch for energization when the ambient temperature as sensed by said temperature sensitive means is below a predetermined value.

2. The system as claimed in claim 1, further comprising a manual override switch whereby said heater may be supplied with power irrespective of the state of said temperature sensitive means.

3. The system as claimed in claim 1, wherein said temperature sensitive means is disposed in the vicinity of the windshield-wiper.

4. The system as claimed in claim 1, wherein said windshield-wiper includes an elongated support and a wiper blade supported by said support, and said heater is disposed extending along said support.

5. The system as claimed in claim 1, wherein said windshield-wiper includes an elongated support and a wiper blade supported by said support, and said heater is embedded in said wiper blade and extends along said blade.

6. The system as claimed in claim 4 or claim 5, wherein said temperature sensitive means is provided on said support in a position where said temperature sensitive means is free from the influence of said heater.

* * * * *